(12) United States Patent
Tada et al.

(10) Patent No.: US 7,147,949 B2
(45) Date of Patent: Dec. 12, 2006

(54) FUEL ELECTRODE OF SOLID POLYMER ELECTROLYTE FUEL CELL

(75) Inventors: Tomoyuki Tada, Hiratsuka (JP); Masahiko Inoue, Hiratsuka (JP)

(73) Assignees: Tanaka Kikinzoku Kogyo K.K., Tokyo (JP); Honda Motor Co., Ltd., Tokyo (JP)

( * ) Notice: Subject to any disclaimer, the term of this patent is extended or adjusted under 35 U.S.C. 154(b) by 490 days.

(21) Appl. No.: 10/464,486

(22) Filed: Jun. 19, 2003

(65) Prior Publication Data

US 2004/0214058 A1 Oct. 28, 2004

(30) Foreign Application Priority Data

Jun. 20, 2002 (JP) .......................... P2002-180105

(51) Int. Cl.
*H01M 8/18* (2006.01)
*H01M 4/86* (2006.01)
*H01M 4/88* (2006.01)

(52) U.S. Cl. .............................. 429/21; 429/40; 429/42

(58) Field of Classification Search .................. 429/13, 429/21, 40, 42; 502/101
See application file for complete search history.

(56) References Cited

U.S. PATENT DOCUMENTS 5,607,785 A * 3/1997 Tozawa et al. ................ 429/33

2002/0015879 A1 2/2002 Gascoyne et al.

FOREIGN PATENT DOCUMENTS

| WO | WO 00/72391 A2 | 11/2000 |
|----|----|----|
| WO | WO 00/72391 A3 | 11/2000 |
| WO | WO 01/15247 A2 | 3/2001 |
| WO | WO 01/15247 A3 | 3/2001 |
| WO | WO 01/15254 A2 | 3/2001 |
| WO | WO 01/15254 A3 | 3/2001 |
| WO | WO 01/15255 A2 | 3/2001 |
| WO | WO 01/15255 A3 | 3/2001 |

* cited by examiner

*Primary Examiner*—Gregg Cantelmo
(74) *Attorney, Agent, or Firm*—Rothwell, Figg, Ernst & Manbeck pc

(57) ABSTRACT

The present invention provides a fuel electrode of a solid polymer electrolyte fuel cell for advancing a fuel cell reaction to oxidize the fuel introduced through a diffusion layer, comprising at least one reaction layer which is in contact with a solid polymer electrolyte membrane and advances the fuel cell reaction and at least one water decomposition layer which is in contact with the diffusion layer and electrolyzes the water in the fuel electrode. The layer taking charge of the fuel cell reaction is protected by providing the fuel electrode having a multilayer structure and providing the layer for preferentially performing the electrolysis of the water contained in the fuel or the like. This results in a fuel electrode in which the reduction of the electrode performance will not easily occur even when fuel shortage may be created.

7 Claims, 3 Drawing Sheets

(a)

Solid membrane electrolyte

Diffusion layer (b)

Solid membrane electrolyte

Diffusion layer (c)

Solid membrane electrolyte

Diffusion layer (d)

Solid membrane electrolyte

Diffusion layer

▓ Catalyst/ion exchange resin

▒ Catalyst/water repellent resin

▨ Catalyst/ion exchange resin/water repellent resin

Prior Art

FUEL ELECTRODE OF SOLID POLYMER ELECTROLYTE FUEL CELL

BACKGROUND OF THE INVENTION

1. Field of the Invention

The present invention relates to a fuel electrode of a solid polymer electrolyte fuel cell. More particularly, the present invention relates to a fuel electrode of a solid polymer electrolyte fuel cell in which the reduction of the electrode performance is difficult to occur even in low fuel conditions caused by an interruption of fuel supply or the like.

2. Description of the Related Art

Fuel cells have high expectations for a next-generation power generation system. In particular, a solid polymer electrolyte fuel cell using a solid polymer electrolyte as an electrolyte is promising as a power supply for electric vehicles because it operates at relatively low temperatures compared with other types of fuel cells such as a phosphoric acid fuel cell and is compact.

FIG. 3 schematically shows the structure of a solid polymer electrolyte fuel cell. As shown in FIG. 3, the solid polymer electrolyte fuel cell 1 has a laminated structure consisting of two electrodes, a fuel electrode 10 and an air electrode 11, and a solid polymer electrolyte membrane 12 held tight between these electrodes. In addition, a dispersion layer 13 to supply fuel across both of the electrodes is provided for each of the electrodes, and a plurality of separators 14 are further installed to partition the cells of the fuel cell. In this solid polymer electrolyte fuel cell 1, the fuel consisting of hydrogen or methanol is supplied to the fuel electrode 10 to be oxidized to produce proton; oxygen or air is supplied to the other air electrode 12 to be reduced to oxygen ion; and the oxygen ion is combined with the proton that has passed through the solid polymer electrolyte membrane 12 from the fuel electrode 10 to form water, these reactions resulting in generation of electric power.

The solid polymer electrolyte fuel cells that satisfy requests such as efficient power generation performance or reduction of device size have been developed and are proceeding toward practical utilization. However, a new problem that the cell performance is reduced during fuel shortage in the operation of the fuel cell has been identified in recent years. More specifically, when abnormal conditions of fuel supply occur for some reason during the normal operation of the fuel cell, the fuel shortage reduces the electrode performance in the fuel electrode to reduce the cell performance, thereby interfering with the constant supply of electric power.

On the occurrence of such reduction of the electrode performance due to fuel shortage, the suspension of the electric power supply would be temporary and not critical if the performance could be restored by the re-normalization of the fuel supply. However, according to the previous reports, it has been recognized that the reduction of the electrode performance due to fuel shortage is irreversible and will not restore completely when the fuel supply is restarted.

Among the measures for these problems of the irreversible performance reduction due to fuel shortage, the establishment of a supply system in which the fuel supply never stops will be the first. However, even if improvement of such a peripheral system would be possible, it would be preferable to make improvements also to a fuel cell or an electrode itself that prevent the performance reduction during the fuel shortage, on the assumption of potential accidents.

As the measures for a fuel cell or an electrode itself, improvements of catalysts composing electrodes or of the structure of electrodes have been reported. As the improvement of catalysts, for example, it is known to add ruthenium oxide ($RuO_2$) or iridium oxide ($IrO_2$) to a catalyst layer. As additional measures for the improvement, it is effective that the support to be applied is selected from the supports that have stable oxidation properties, such as graphitic carbon or titanium oxide ($Ti_4O_7$), and in addition that the loading of the catalyst particles on the support is to be increased (Refer to International Publications WO01/15247 and WO01/15254 for details of the improvement plans on these catalysts).

Further, as the measures in terms of the improvement of electrode structures, it is possible to minimize the performance reduction during fuel shortage by the procedure to increase the content of water in electrodes or by making it possible to suppress the discharge of water for the catalyst layer or the diffusion layer that composes electrodes (Refer to an International Publication WO01/15255 for details of the improvement plan).

However, according to the consideration of the present inventors, although these measures are effective, they are not sufficient, and measurable reduction of performance is identified during fuel shortage even when these measures are taken. Therefore, there is a need to look for further improvements different from these measures.

The present invention has been created under the background described above, and the object of the present invention is to provide a fuel electrode of a solid polymer electrolyte fuel cell in which the reduction of the electrode performance will not easily occur even when fuel shortage may be created.

SUMMARY OF THE INVENTION

To achieve the above object, the inventors have first studied the factors of the performance reduction of fuel electrodes during fuel shortage, and have considered that the factor involves the fact that a dominant reaction produced in the fuel electrodes varies during the fuel shortage.

This point will now be explained taking as an example a case in which hydrogen is applied as fuel. At the fuel electrode in a condition in which fuel is being supplied, proton is produced by a catalytic oxidation of hydrogen molecules, and this decomposition reaction of hydrogen molecules is normally dominant. The potential of the fuel electrode in this condition is approximately 0 V (with reference to the hydrogen electrode). On the other hand, when the fuel shortage is created, the electrolysis reaction of the water that is contained in the fuel or held by the fuel electrode or a solid polymer electrolyte arises at the fuel electrode in order to supply proton that is lacking, and this reaction becomes dominant. The potential of the electrolysis of water is 1.23 V or above (with reference to the hydrogen electrode). Therefore, the creation of the fuel shortage increases the potential of the fuel electrode.

The inventors have considered that such environmental changes for the fuel electrode (increase in potential) have caused some change in the fuel electrode catalyst, resulting in the reduction of the activation. Thus, the inventors have studied the change that arises in the catalyst, and have considered that the potential increase causes the formation of some film on the surface of the catalyst, and the film reduces the activity of the catalyst. In addition, the inventors have considered that the formation of the film is irreversible, and the film will not decompose or disappear even after the fuel supply is normalized after the fuel shortage, but will remain on the surface of the catalyst, thereby preventing the reactivation of the catalyst.

Under the above described consideration, the inventors have found that the problem to be solved by the present invention can be solved by providing a fuel electrode having a multilayered structure, in which a layer for preferentially promoting the electrolysis reaction of water during fuel shortage is provided so as to prevent the occurrence of the electrolysis reaction of water in the region for advancing the fuel cell reaction, as the means for suppressing the performance reduction of the fuel electrode due to fuel shortage, and have hit upon the present invention.

The present invention provides a fuel electrode of a solid polymer electrolyte fuel cell for advancing a fuel cell reaction to oxidize the fuel introduced through a diffusion layer, comprising at least one reaction layer which is in contact with a solid polymer electrolyte membrane and advances the fuel cell reaction and at least one water decomposition layer which is in contact with the diffusion layer and electrolyzes the water in the fuel electrode.

Thus, the present invention provides a fuel cell electrode having a multilayered structure, which has generally been of a single layer, and at least one electrode layer (water decomposition layer) for preferentially performing water decomposition is provided, thereby allowing avoidance of influence from the electrolysis of water on the other electrode layer (reaction layer) that is taking charge of the fuel cell reaction. With this structure, no water decomposition reaction will occur at the reaction layer even during fuel shortage, so that the reduction of performance, in particular, the irreversible reduction of performance will not easily occur.

Such structures of the water decomposition layer capable of preferentially performing the water electrolysis include those containing a water repellent resin in addition to the catalyst capable of promoting the electrolysis reaction of water. The electrode for fuel cells typically includes a mixture of a catalyst for promoting the fuel cell reaction and an ion exchange resin. As described hereinafter, the reaction layer for advancing the fuel cell reaction in the present invention often include such a construction. On the other hand, it is necessary to mix the water repellent resin replacing the ion exchange resin in order to exhibit a function as the water decomposition layer. Although the factor for promoting the decomposition of water by adopting such a construction is not necessarily clear, the present inventors consider that the mixing of the catalyst with the water repellent resin suppresses the occupation by water of the holes of the mixture layer. More particularly, the holes in the mixture layer of the catalyst and the ion exchange resin are easily occupied by water, and when the holes are filled with water, the diffusion of oxygen generated by the electrolysis of water is prevented, so that the progress of the electrolysis reaction of water is disturbed, thereby preventing the preferential water decomposition reaction. On the other hand, it is considered that the mixing of the water repellent resin can avoid the occupancy of the holes in the layer with water and secure the diffusion path of the water to be produced, thereby promoting the electrolysis reaction of water.

The catalysts for composing the water decomposition layer preferably include precious metal catalysts in terms of catalytic activity, and preferably include those in which one or more precious metals selected from platinum, ruthenium, iridium and silver are supported on a support as catalyst components. Further, most preferably, the catalysts include those in which an alloy of at least two metals from these precious metals, such as platinum-ruthenium or platinum-iridium, are supported. Because these alloy catalysts are further excellent in catalytic activity and stability. Carbon fine powders that have been generally used as a catalyst support are preferred for the support. Furthermore, the loading of the catalytic components to the support is preferably from 10 to 60% in terms of ensuring activity and reducing the size of the overall electrode.

Water repellent resins such as PTFE, PFA, PVDF and PFEP can be applied. The ratio of the catalyst to the water repellent resin for composing the water decomposition layer is preferably from 4:1 to 1:4 by the weight ratio of the catalyst support weight to the water repellent resin weight. In order for the water decomposition layer to preferentially perform the electrolysis of water, some extent of water repellent resin is need to be mixed since the permeation of water into the holes need to be suppressed. However, when the content of the water repellent resin is too high, the capacity of the water decomposition layer to support water decreases, resulting in allowing the electrolysis of water hard to occur. In terms of the balance of the both, the range described above is suitable.

The water decomposition layer may also include a small amount of the ion exchange resin. However, the content (ratio) of the ion exchange resin in this case is preferably smaller than the content of the ion exchange resin in the fuel electrode to be described hereinafter. This is because a too high content of the ion exchange resin increases the occupancy of the holes in the water decomposition layer and may prevent oxygen diffusion. Thus, specifically, the content of the ion exchange resin is preferably 33% by weight or less relative to the total of the catalyst and the water repellent resin.

In addition, according to the inventors, the effect for decomposing water in the water decomposition layer becomes noticeable by providing the water decomposition layer having a porous structure that is more porous than the reaction layer. This is clearly observed when the water decomposition layer is a mixture of the catalyst, the water repellent resin and the ion exchange resin, and the reaction layer is also formed in a similar structure, as described above. The efficiency for decomposing water in the water decomposition layer is improved because the porous structure increases the holes to enhance the diffusion of oxygen, thereby promoting the electrolysis of water.

Comparing with the water decomposition layer described above, those having a construction similar to conventional fuel electrodes for fuel cells are applied to the reaction layer in contact with the solid polymer electrolyte membrane. Here, the construction for the reaction layer basically includes a mixture of the catalyst for promoting the fuel cell reaction and the ion exchange resin. For the catalyst, precious metal catalysts such as a platinum catalyst and a platinum-ruthenium alloy catalyst are used. The loading of the catalyst is preferably from 30 to 60%. Further, the ion exchange resins to be applied include those having the same property as those used in the solid polymer electrolyte membrane, for example, perfluorosulfonic acid. The mixing ratio of the catalyst to the ion exchange resin is preferably from 1:0.5 to 1:2.0 by the weight ratio of the weight of the support of the catalyst to the weight of the ion exchange resin.

The reaction layer may include water repellent resins in some cases. For the water repellent resin in these cases, the one similar to those used in the water decomposition layer can be applied. The amount of the water repellent resin to be added is preferably 33% by weight or less relative to the total of the catalyst and the ion exchange resin.

The fuel electrode according to the present invention may include at least one layer for both the reaction layer and the water decomposition layer, but each of the layers may include a plurality of layers. For example, the water decomposition layer may include a laminate of a plurality of water decomposition layers having different mixing ratio or the like of the catalyst to the water repellent resin. Also, for the reaction layer, fuel electrodes having a multilayered structure with different catalyst types and mixing ratios have been known, and the reaction layer of the present invention may include such a structure. However, a preferred form includes the one that the both layers include single layers, and most preferred is the one in which the water decomposition layer is single. Because the production of the electrode becomes easier by the single layer, and for suppressing the performance reduction during fuel shortage, no particular improvement in the effect can be observed by having a plurality of water decomposition layers.

According to the above description, the modes of the fuel electrode of the solid polymer electrolyte fuel cell according to the present invention include four types shown in FIG. 1. FIG. 1 illustrates four patterns in total including two patterns ((a) and (b)) for the cases applying a mixture of a catalyst and an ion exchange resin to a reaction layer and two patterns ((c) and (d)) for the cases where the reaction layer further includes a water repellent resin. These four patterns are used as basic patterns, in which the types and mixing ratios for each of the components may be appropriately adjusted to prepare fuel electrodes depending on various uses of fuel cells.

The fuel electrode according to the present invention has a multilayered structure consisting of at least two layers. For producing the same, it is preferable to form a reaction layer on the surface of a solid polymer electrolyte membrane, form a water decomposition layer on a diffusion layer and join the reaction layer and the water decomposition layer. In the production of fuel cell electrodes, generally, a mixed paste (catalyst paste) of a catalyst with a resin is produced, and the paste is applied on the surface of either a solid polymer electrolyte membrane or a diffusion layer, dried and hot-pressed to form a solid electrode. In this case, the denseness of the electrode depends on the substrate on which the paste is applied, and a porous electrode may be prepared by applying the paste on a porous substrate and burning. As described above, the water decomposition layer is preferably porous. In consideration of this, it is possible to prepare a porous water decomposition layer utilizing a porous diffusion layer as a substrate for applying paste. Thus, it is possible to achieve a multilayered-structure electrode of a preferred embodiment by forming a porous water decomposition layer at the diffusion layer side and forming a reaction layer at the polymer membrane side, thereby providing a difference in the denseness between the both layers.

However, it has been recognized by the present inventors that when, for example, a catalyst/ion exchange resin mixture is used for the reaction layer and a catalyst/water repellent resin mixture is used for the water decomposition layer, the effect of the present invention is exhibited without using a porous water decomposition layer. Thus, when the denseness of the water decomposition layer is not worth due consideration, the fuel electrode may be provided by forming both the reaction layer and the water decomposition layer on either a polymer membrane or a diffusion layer.

Further, the fuel to be supplied to the fuel electrode according to the present invention is not particularly limited, and may include so called reformed hydrogen that is directly supplied from liquid fuel, natural gas or the like. However, the reformed hydrogen often contains a very small quantity of impurities such as carbon monoxide. Therefore, in consideration of the resistance to catalyst poisoning by carbon monoxide, the fuel cell to which the reformed hydrogen is directly supplied will find a difficulty in maintaining the performance during fuel shortage even by the present invention. Thus, for insuring the effect of the present invention to be exhibited, it is preferable to apply hydrogen containing no carbon monoxide (pure hydrogen) as the fuel.

DETAILED DESCRIPTION OF THE PREFERRED EMBODIMENTS

Preferred embodiments of the present invention will now be described together with drawings and comparative examples. In the following embodiments, a reaction layer and a water decomposition layer are formed with a specific mixing ratio for four modes of the fuel electrodes shown in FIG. 1, and the fuel electrodes for each of the modes have been produced for the study of the performance. For the catalysts, ion exchange resins and water repellent resins for composing each of the layers, the followings are provided.

First, a platinum-ruthenium catalyst was used for the catalyst for the reaction layer. The platinum-ruthenium catalyst was produced, first by producing a platinum catalyst, and then by allowing the platinum catalyst to support ruthenium as well as alloying platinum and ruthenium. The platinum catalyst was produced by impregnating a solution of dinitrodiammineplatinum in nitric acid having a platinum concentration of 2.2% by weight into commercially available carbon fine powders (trade name: Ketjenblack EC, specific surface area of 800 $m^2$/g) as a support, adding a reducing agent (ethanol), stirring at 95° C. for six hours, filtrating and drying. The platinum-ruthenium alloy catalyst was prepared by impregnating a ruthenium chloride solution containing 6.24% by weight of ruthenium into the platinum catalyst and by drying to support ruthenium on the platinum catalyst, and further by maintaining them at 900° C. for one hour in 50% hydrogen gas (balance: nitrogen gas) for alloying. The platinum-ruthenium catalyst had a loading ratio (molar ratio) of platinum to ruthenium of 1:1 and a loading of the catalyst components of 50%.

A platinum catalyst was used for the catalyst in the water decomposition layer. For this platinum catalyst, the platinum catalyst obtained in the process for producing the platinum-ruthenium alloy catalyst described above was used (loading of 40%). In addition, perfluorosulfonic acid (trade name: Nafion, available from DuPont Corporation) was used for the ion exchange resin and PTFE (trade name: Lubron, available from Daikin Industries, Ltd.) was used for the water repellent resin.

First Embodiment

Figure 1:
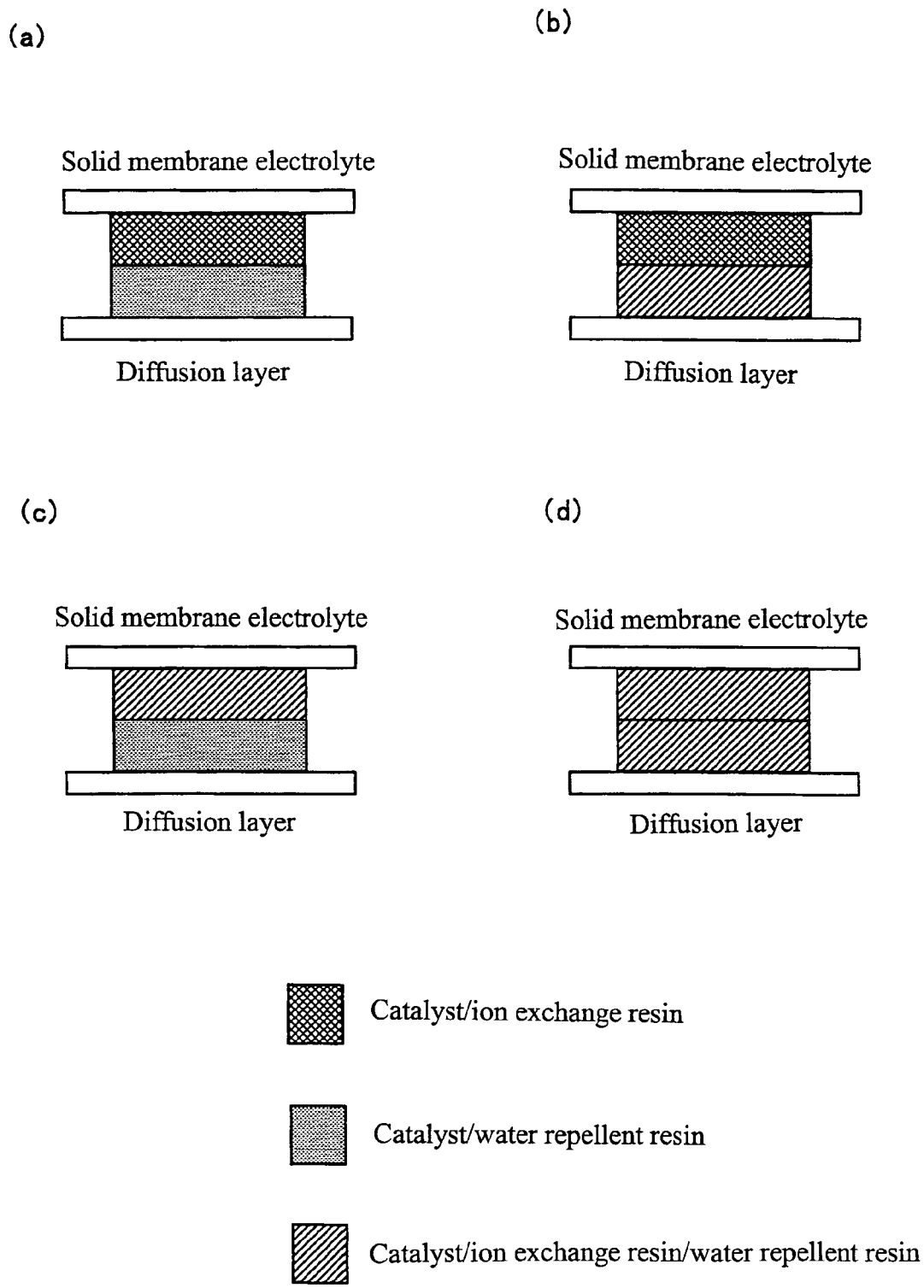
FIG. 1 illustrates the types of the fuel electrode of the solid polymer electrolyte fuel cell according to the present invention.

In the present embodiment, the fuel electrode corresponding to (a) in FIG. 1 was produced. First, 1 g of fine powders of the resin prepared by spray-drying a 5% solution of the above described ion exchange resin and 2 g of the above described platinum-ruthenium catalyst were added to 25 mL of an aqueous solution of 1-propanol, and they were mixed for 50 minutes with a ball mill, preparing a catalyst paste. Next, the catalyst paste was applied by printing on the surface of a polymer electrolyte membrane (Nafion 112) such that the loading of platinum is 0.2 mg/cm$^2$ to form the reaction layer.

On the other hand, for the water decomposition layer, 1 g of the above described fine powders of the water repellent resin and 1.7 g of the above described platinum catalyst were added to 25 mL of an aqueous solution of 1-propanol, and they were mixed for 50 minutes with a ball mill, preparing a catalyst paste. Next, the catalyst paste was applied by printing on the surface of a diffusion layer such that the loading of platinum is 0.1 mg/cm$^2$ to form the water decomposition layer. Note that for the diffusion layer a carbon paper having carbon and PTFE coated on the top layer was used.

Then, the reaction layer (polymer electrolyte membrane) and the water decomposition layer (diffusion layer) produced in the above processes were opposedly stacked and incorporated into a measurement cell for the test to be described hereinafter, bonding the both layers to form the fuel electrode.

Second Embodiment

In the present embodiment, the fuel electrode corresponding to (b) in FIG. 1 was produced. The reaction layer was produced in a manner similar to First Embodiment. On the other hand, an ion exchange resin was further added to the water decomposition layer in the present invention. Specifically, 1 g of fine powders of the ion exchange resin was further added when producing the catalyst paste for the water decomposition layer, other processes being similar to First Embodiment. The produced reaction layer and water decomposition layer were bonded to form the fuel electrode by a method similar to First Embodiment.

Third Embodiment

In the present embodiment, the fuel electrode corresponding to (c) in FIG. 1 was produced. A water repellent resin was further added to the reaction layer of this embodiment. Specifically, 1 g of fine powders of the water repellent resin was further added when producing the catalyst paste for the reaction layer, other processes being similar to First Embodiment. On the other hand, the water decomposition layer was produced in a manner similar to First Embodiment. The produced reaction layer and water decomposition layer were bonded to form the fuel electrode by a method similar to First Embodiment.

Fourth Embodiment

In the present embodiment, the fuel electrode corresponding to (d) in FIG. 1 was produced. The reaction layer and the water decomposition layer were produced by the method similar to Third Embodiment and Second Embodiment, respectively, and the final boding of the both layers was performed in a manner similar to First Embodiment.

Fifth Embodiment

In the present invention, the fuel cell electrode that corresponds to (d) in FIG. 1, like Fourth Embodiment, was produced, which is adjusted such that the content of the ion exchange resin in the water decomposition layer is smaller than that in the reaction layer. The water decomposition layer was produced in a manner similar to Second Embodiment, but the ion exchange resin was added in an amount of 0.5 g (15.6%) for adjusting the content.

COMPARATIVE EXAMPLE 1

As a comparative example to the above described embodiments, a conventional fuel electrode (single layer) was produced. The catalyst paste for the reaction layer produced in a process similar to First Embodiment was applied by printing on the surface of a polymer electrolyte membrane (Nafion 112) such that the loading of platinum is 0.2 mg/cm$^2$ to form the fuel electrode.

COMPARATIVE EXAMPLES 2 AND 3

These comparative examples are intended for verifying the effect of the multilayer electrode according to the present invention, which have single electrodes (catalyst/water repellent resin and catalyst/water repellent resin/ion exchange resin) including a water repellent resin. Comparative Example 2 is formed in a single layer in a construction similar to the water decomposition layer of First Embodiment (catalyst/water repellent resin). Also, Comparative Example 3 is formed in a single layer in a construction similar to the reaction layer of Third Embodiment (catalyst/water repellent resin/ion exchange resin). The catalyst paste was applied by printing on the diffusion layer for Comparative Example 2 and on the polymer electrolyte membrane for Comparative Example 3, respectively, such that each loading of platinum is 0.2 mg/cm$^2$, to form these fuel electrodes.

Then, fuel electrodes according to the above described First to Fifth Embodiments and Comparative Examples 1 to 3 were combined respectively with air electrodes to form fuel cells for studying the change of single cell performance during fuel shortage, wherein a mixture of the platinum catalyst and the ion exchange resin was used for the electrode.

The fuel shortage test was performed according to the following procedure. First, hydrogen and oxygen were fed through the fuel electrode and the air electrode, respectively (flow rate of 1 L/min and 1 L/min, respectively), and the single cell performance (current density-potential performance) at this time was measured. Then, the gas supply to the both electrodes was interrupted; wet nitrogen gas was supplied to the both electrodes; and a current of 200 mA/cm$^2$ was passed for 11 minutes compulsorily (Hereinafter, this step is referred to a fuel shortage test.). At this time, the potential of the fuel electrode was maintained at 1.4 V or above (the potential of the electrolytic potential of water or above). After this fuel shortage test, hydrogen and oxygen were fed again to the fuel electrode and the air electrode, respectively, and measured the single cell performance at this time. At the measurement of the single cell performance before and after the fuel shortage test, the potential values at specific current densities (1 A/cm$^2$, 2 A/cm$^2$ and 3 A/cm$^2$) were determined, respectively, and the difference of the potential values at each current density, $\Delta V$, was calculated. The presence or absence of the performance reduction after the fuel shortage test is to be determined by the magnitude of the $\Delta V$.

Figure 2:
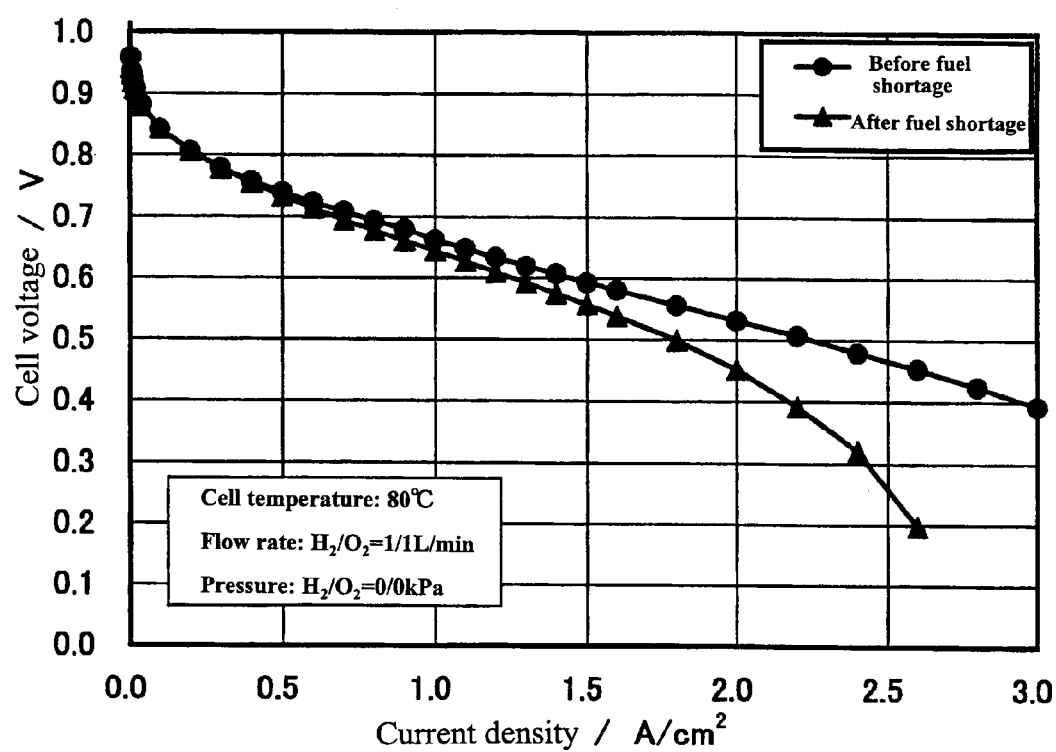
FIG. 2 illustrates the performance of a single cell before and after a fuel shortage test for Comparative Example 1.
Figure 3:
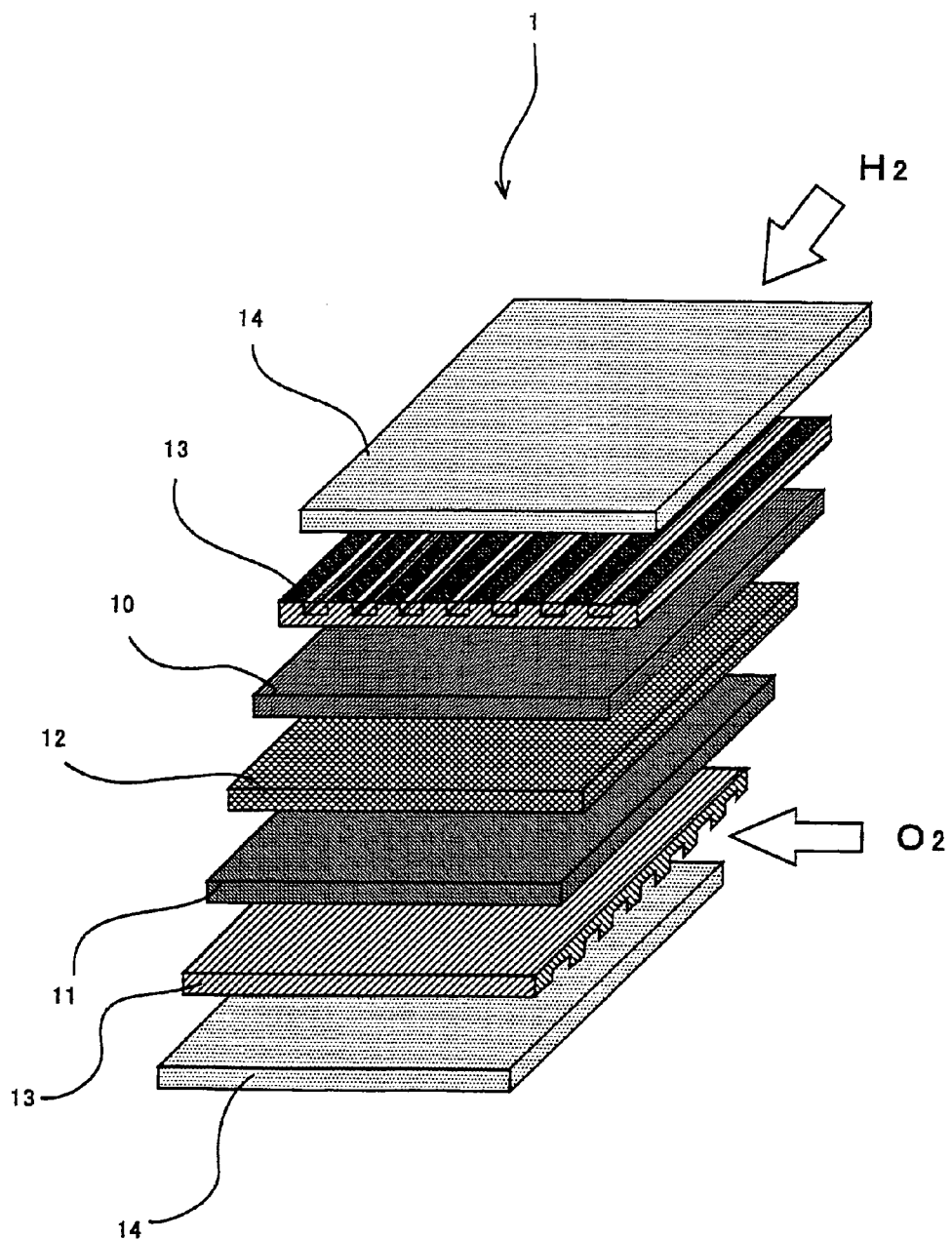
FIG. 3 illustrates the construction of a typical solid polymer electrolyte fuel cell.

FIG. 2 shows the results of the fuel shortage test for Comparative Example 1. As understood from FIG. 2, the potential after the fuel shortage is lower than that before the fuel shortage in the fuel electrode for Comparative Example 1. More specifically, $\Delta V$s for the current densities of 1

A/cm$^2$, 2 A/cm$^2$ and 3 A/cm$^2$ are 18 mV, 78 mV and 400 mV or more, respectively. These results indicate that the loss of the electrode performance has arisen due to the fuel shortage in Comparative Example 1.

The fuel shortage test was performed for each embodiment and comparative example in a manner similar to Comparative Example 1 and ΔV in each current density was determined. The results are shown in Table 1.

TABLE 1

|  | ΔV (mV) | | |
| --- | --- | --- | --- |
|  | 1 A/cm$^2$ | 2 A/cm$^2$ | 3 A/cm$^2$ |
| First Embodiment | 6 | 34 | 77 |
| Second Embodiment | 7 | 32 | 76 |
| Third Embodiment | 9 | 33 | 90 |
| Fourth Embodiment | 17 | 37 | 85 |
| Fifth Embodiment | 12 | 37 | 64 |
| Comparative Example 1 | 18 | 79 | 400 or more |
| Comparative Example 2 | — | — | — |
| Comparative Example 3 | 22 | 82 | 254 |

— nonmeasurable

As understood from Table 1, ΔV values are considerably lower in the fuel electrodes according to each of the embodiments than those in Comparative Example 1 (having the same construction as conventional fuel electrodes). These results indicate that the performance reduction on the fuel shortage is suppressed in the fuel electrode having a multilayer structure according to each of the embodiments. On the other hand, Comparative Example 3 shows similar behavior to Comparative Example 1, which indicates that Comparative Example 3 has no effect on the fuel shortage. Comparative Example 2 was nonmeasurable. This result indicates that Comparative Example 2, which includes no ion exchange resin, does not have the intrinsic action of the fuel electrode (for promoting the fuel cell reaction).

Sixth Embodiment

In the present embodiment, the construction of the water decomposition layer was changed from a platinum catalyst in First Embodiment to a platinum-ruthenium alloy catalyst, for producing the fuel electrode. This platinum-ruthenium alloy catalyst is similar to that used in First Embodiment. Further, the water decomposition layer was produced by a process similar to First Embodiment except that the mixing quantity of the catalyst was changed to 2.0 g, in the production of the catalyst paste for the water decomposition layer in First Embodiment. Note that the reaction layer was prepared in a manner similar to First Embodiment.

Seventh Embodiment

In the present embodiment, the construction of the water decomposition layer was changed from a platinum catalyst in First Embodiment to a platinum-iridium alloy catalyst for producing the fuel electrode. The platinum-iridium alloy catalyst was produced by impregnating an iridium chloride solution containing 6.0% weight of iridium into the above described platinum catalyst and by drying to support iridium on the platinum catalyst, and further by maintaining them at 900° C. for one hour in 50% hydrogen gas (balance: nitrogen gas) for alloying. The platinum-iridium catalyst had a loading ratio (molar ratio) of platinum to iridium of 1:1 and a loading of the catalyst components of 57%.

The platinum-iridium catalyst was used to produce the water decomposition layer to produce the fuel electrode. The water decomposition layer was produced by a process similar to First Embodiment except that the mixing quantity of the catalyst was changed to 2.33 g, in the production of the catalyst paste for the water decomposition layer in First Embodiment. Note that the reaction layer was prepared in a manner similar to First Embodiment.

The fuel shortage tests were performed for the fuel electrodes prepared in the above Sixth and Seventh Embodiments in a manner similar to from First to Fifth Embodiments, and ΔVs were calculated from the results of the measurements of the single cell performance before and after the fuel shortage tests. The results are shown in Table 2. Table 2 shows the result of First Embodiment 1 together.

TABLE 2

|  | ΔV (mV) | | |
| --- | --- | --- | --- |
|  | 1 A/cm$^2$ | 2 A/cm$^2$ | 3 A/cm$^2$ |
| Sixth Embodiment | 5 | 25 | 66 |
| Seventh Embodiment | 5 | 25 | 67 |
| First Embodiment | 6 | 34 | 77 |

As understood from Table 2, ΔV values are considerably lower in the fuel electrodes according to Sixth and Seventh Embodiments than those in Comparative Examples, which indicates that the performance reduction on the fuel shortage is suppressed. In particular, ΔV values in these embodiments are further a little lower than that in First Embodiment, indicating better effect.

As described above, the fuel electrode of the solid polymer electrolyte fuel cell according to the present invention can suppress the performance reduction due to the interruption of the fuel supply. In particular, it has been verified that the performance is reactivated upon normalization of the fuel supply without the irreversible reduction of the performance that has been observed in conventional fuel electrodes. The present invention can improve the reliability of the solid polymer electrolyte fuel cell and can contribute to the promotion of its commercialization.

What is claimed is:

1. A fuel electrode of a solid polymer electrolyte fuel cell for advancing a fuel cell reaction to oxidize the fuel introduced through a diffusion layer, comprising: at least one reaction layer which is in contact with a solid polymer electrolyte membrane and advances said fuel cell reaction, and at least one water decomposition layer which is in contact with said diffusion layer and electrolyzes the water in the fuel electrode, wherein said water decomposition layer is more porous than said reaction layer.

2. The fuel electrode of a solid polymer electrolyte fuel cell according to claim 1, wherein the water decomposition layer comprises a mixture of a precious metal catalyst and a water repellent resin.

3. The fuel electrode of a solid polymer electrolyte fuel cell according to claim 2, wherein the precious metal catalyst comprises a carrier having carried thereon anyone or more of precious metals selected from the group consisting of platinum, ruthenium, iridium and silver, or an alloy of at least two of the precious metals as a catalyst component.

4. The fuel electrode of a solid polymer electrolyte fuel cell according to claim 2, wherein the water decomposition layer further comprises an ion exchange resin.

5. The fuel electrode of a solid polymer electrolyte fuel cell according to claim 1, wherein the reaction layer is a mixture of the precious metal catalyst and the ion exchange resin.

6. The fuel electrode of a solid polymer electrolyte fuel cell according to claim 5, wherein the reaction layer further comprises the water repellent resin.

7. A method for producing the fuel electrode of a solid polymer electrolyte fuel cell, said fuel electrode of a solid polymer electrolyte fuel cell as defined in claim 1, comprising the steps of:

forming the reaction layer on the surface of the solid polymer electrolyte membrane, forming the water decomposition layer more porous than the reaction layer on the diffusion layer, and joining said reaction layer and said water decomposition layer.

* * * * *